United States Patent [19]

Spann

[11] 4,287,925
[45] Sep. 8, 1981

[54] ANTISKID DEVICE

[76] Inventor: Robert Spann, 121 Kingsbury, Norman, Okla. 73069

[21] Appl. No.: 101,889

[22] Filed: Dec. 10, 1979

[51] Int. Cl.³ .............................................. B60C 27/00
[52] U.S. Cl. ................................... 152/221; 152/210
[58] Field of Search ...................... 152/221, 210–212, 152/218, 242

[56] References Cited

U.S. PATENT DOCUMENTS

| | | | |
|---|---|---|---|
| 377,371 | 5/1943 | Hetz | 152/221 |
| 990,651 | 4/1911 | Heer | 152/221 |
| 1,578,803 | 3/1926 | Comey | 152/221 |
| 1,932,576 | 10/1933 | Dodge | 152/221 |
| 2,085,204 | 6/1937 | Sullivan | 152/221 |
| 2,370,790 | 3/1945 | Glasser | 152/221 X |
| 2,422,595 | 6/1947 | Stevens | 152/221 |

*Primary Examiner*—John T. Goolkasian
*Assistant Examiner*—Thomas Bokan
*Attorney, Agent, or Firm*—William R. Laney

[57] ABSTRACT

An antiskid device for mounting on pneumatic vehicle tires including a pair of annular elastomeric tubular sidewall elements interconnected by a plurality of spaced traction straps. Each traction strap is a laminated structure including a pair of spaced layers of woven nylon web having a layer of rubber interposed therebetween and bonded to each nylon layer. A body of rubber is bonded to one of said nylon layers and has traction nubs projecting therefrom. The tubular elements are each of natural rubber and each has an inside diameter of from about one-fourth inch to about one-half inch, and a wall thickness of from about one-eighth inch to about three-sixteenths inch.

8 Claims, 7 Drawing Figures

ANTISKID DEVICE

BACKGROUND OF THE INVENTION

1. Field of the Invention

This invention relates to traction structures adapted for securement about the periphery of pneumatic vehicle tires to afford improved traction on slick surfaces.

2. Brief Description of the Prior Art

The ever present problem of providing adequate traction to automobiles under driving conditions where ice and snow cover the roadways has elicited a number of proposed solutions over many years. Generally, such solutions propose the attachment of one or more traction enhancing devices to the pneumatic tires to enable them to bite into or grip slick surfaces more efficiently than the conventional rubber treads carried by the pneumatic tires. Such devices have taken a number of forms, including, as general categories, rubber or synthetic rubber webs which attach to the tire and include some form of straps or belts extending across the tread face of the tire, and metallic traction devices, such as chains, which are secured on the tire and provide sections of chain which extend transversely across the tread face and bite into the ice or snow covering the roadway to afford improved traction.

Chains or metallic antiskid devices have been thought to be most effective and satisfactory in cases where the roadway is covered with a sheet of ice, and the frictional engagement between the roadway and the wheels of the vehicle is poor. The rubber or elastomeric antiskid devices have the advantage over chains and metallic devices in that they do not damage, or cause the wear to, tires upon which they are mounted that such metallic devices cause, and are much quieter in use.

Among the elastomeric types of antiskid devices previously proposed are those which are disclosed in U.S. Pat. Nos. 1,578,803 to Comey, 990,651 to Heer, 4,055,210 to Mongault, 3,770,039 to Pfoertner, 1,932,576 to Dodge, 3,006,397 to Akutowicz and 4,165,774 to Matsui.

The Comey patent proposes to use a pair of flat elastic rings of rubber, or rubber and fabric, which are interconnected by a plurality of crossbars or straps which extend across the tread face of the tire after the rings have been mounted adjacent each of the opposite sidewalls of the tire. The straps are made of the same material as the rings, and both the rings and straps are subject to the normal wear characteristics of rubber, thus undergoing damage and deterioration when subjected to the high stresses induced by high speed driving on rough or nearly dry surfaces.

The type of antiskid device shown in the Heer patent uses inflatable tubular members in annular form as the side members of the device adapted to be positioned adjacent the side walls of the tire. These tubular members are inflatable and are interconnected by crosspieces which are also tubular. Both the annular side pieces and the cross-pieces are indicated to be made of substantially the same type of materials as are pneumatic tires, and the 1911 date of issuance of this patent would suggest that such material is predominantly rubber, considering the prevalent pneumatic tire construction of that day. For the device to perform in accordance with the invention, it is necessary that the annular tubular side elements of the tire be inflated, and that these side elements be interconnected through buckles and apertured connecting end pieces formed at opposite ends of the tubular side elements.

The antiskid device shown in the Dodge patent is similar to that shown in the Heer and Comey patents, but proposes to use solid rubber or solid rubber having fibrous cores embedded therein in both the side pieces and cross straps. The cross straps are molded integrally with the side pieces.

Matsui U.S. Pat. No. 4,165,774 includes a pair of opposed parallel annular cords which are interconnected by cross belts of molded synthetic resin. Each cross belt is connected at its opposite ends by means of rivets to the cords to retain it in position along the length of the cords. The cords are each solid elements which have some capability of stretching. Neither the wearing properties of the cords or the cross belts are referred to in detail by the patentee.

A generally similar construction is shown in the Pfoertner patent, and the material used in making both the cross straps and side elements is indicated to be polyurethane having a high tensile and tear strength and good abrasion resistance.

In U.S. Pat. No. 4,055,210 to Mongault, the side elements employed for anchoring the cross straps are stainless steel solid or stranded wire, and the cross straps are rubber or other suitable elastic material.

The traction harness shown in Akutowicz U.S. Pat. No. 3,006,397 is constructed entirely of a vulcanizable elastomeric material.

BRIEF DESCRIPTION OF THE PRESENT INVENTION

The antiskid device of the present invention is improved in its performance with respect to devices heretofore proposed due to its ease of installation on pneumatic tires, its trouble-free deliverance of increased traction during operation of the vehicle and its extended effective service life.

Broadly described, the antiskid device of the invention comprises a pair of opposed, spaced elastomeric tubular side wall elements which are annular in configuration and adapted to extend along the opposite side walls of a pneumatic tire upon which the device is mounted. The tubular side wall elements are made of natural rubber having a durometer of 35±5 on a Shore A scale, an inside diameter of between about ¼ inch and ½ inch, and a wall thickness of between about ⅛ inch and about 3/16 inch. This material of construction and these dimensions are important to the achievement of an important feature of the invention, i.e., the ease of installation of the antiskid device without sacrifice of tenacity of retention of the device on the pneumatic tire upon which it is placed.

Extending between the tubular side wall elements are a plurality of spaced traction straps. Each of the traction straps is an elongated member of generally rectangular configuration which is connected at its opposite ends to the two tubular side wall elements. Each traction element is a laminated structure characterized in extremely long wear, high thermal degradation resistance and good traction properties. The laminar construction of each traction strap includes a pair of woven nylon layers between which is interposed a layer of natural rubber which is bonded to each of the nylon layers. On the opposite side of one of the woven nylon layers, a body of rubber is bonded to such one nylon layer and includes a plurality of nubs which project outwardly from the body of rubber in a direction opposite the nylon layer to which the body is bonded. The rubber nubs afford excellent traction characteristics to the antiski device. In a preferred embodiment of the invention, the body of rubber is asbestosized by the embedding therein of asbestos fibers.

An important object of the present invention is to provide an improved antiskid device for mounting on pneumatic tires to improve traction with snowy and icy surfaces.

A more specific object of the present invention is to provide an antiskid device which is characterized by an unusually long and trouble-free operating and service life, and which does not easily break down when used on an automobile driven over very rough or bumpy surfaces, or even surfaces which are relatively dry.

A further object of the invention is to provide an antiskid device which can be economically manufactured, can be easily stored in a compact location, is light in weight and can be quickly and easily installed on pneumatic tires of varying sizes.

Additional objects and advantages of the invention will become apparent as the following detailed description of preferred embodiments of the invention is read in conjunction with the accompanying drawings which illustrate such embodiment.

GENERAL DESCRIPTION OF THE DRAWINGS

DETAILED DESCRIPTION OF A PREFERRED EMBODIMENT OF THE INVENTION

Figure 1:
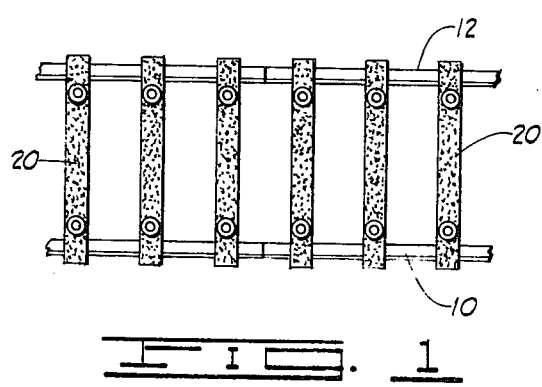
FIG. 1 is a plan view of a portion of the antiskid device of the present invention.

Referring to the general construction of the antiskid device, the structure includes a pair of annular tubular side wall elements designated generally by reference numerals 10 and 12. The tubular side wall elements 10 and 12 extend in substantially parallel planes and are adapted by their circumferential dimension to extend along the side walls of a pneumatic tire 13 at a location spaced downwardly toward the rim 13b upon which the tire is mounted from the face or tread portion of the tire.

The tubular side wall elements 10 and 12 are made of a natural, pure latex rubber material having a durometer of 35±5 on a Shore A scale, meets U.S. Military Specification ZZ-T-8310, Type 5, and each of the tubular side wall elements preferably has an inside diameter of from about ¼ inch to about ½ inch, and an outside diameter of from about ⅜ inch to about 3/16 inch. The most preferred form of each of the tubular side wall elements is one in which the inside diameter is about ¼ inch and the wall thickness is about 3/16 inch. I have found that when the tubular side wall elements 10 and 12 are made of the material which I have described and are dimensioned as described, they possess sufficient resiliency and stretchability to permit them to be easily mounted on most automobile passenger vehicle pneumatic tires, yet possess sufficient strength and resistance to elongation that they tenaciously retain the antiskid device in its operative position on the pneumatic tire once the device is in place.

Figure 5:
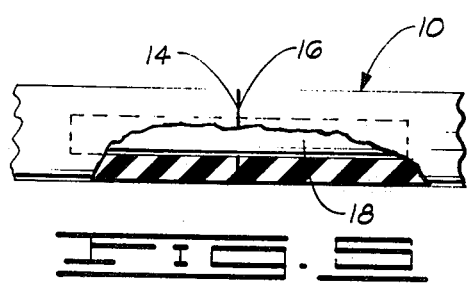
FIG. 5 is an enlarged detail view showing a preferred mode of joining the ends of each of the annular tubular elements forming a part of the antiskid device of the invention.
Figure 6:
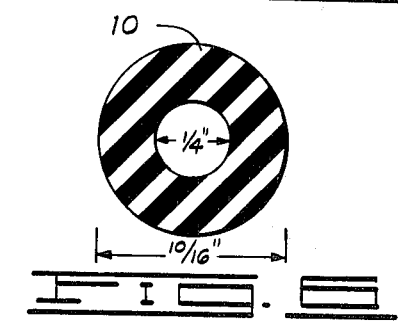
FIG. 6 is a cross-sectional view through one of the annular tubular elements forming a part of the antiskid device.

Although it is possible to mold the tubular side wall elements 10 and 12 to be endless, in a preferred embodiment of the invention, each of the elements has two opposed ends 14 and 16 which are joined in the manner best illustrated in FIG. 5. Thus, in referring to the two joined ends 14 and 16 of the tubular element 10 as shown in FIG. 5, it will be noted that the ends are abutted against each other after a connecting core 18, which can be made of wood or plastic, has been pressed into each of the end portions to splice the two ends together. The core 18, prior to emplacement, is coated with a strong adhesive by which the portion of the core lying inside each of the end portions of the tubular member are bonded to the rubber. The abutted ends 14 and 16 of the tubular member 10 are also coated with adhesive which firmly bonds the ends to each other when they are in contact as shown in FIG. 5. Each of the side wall tubular members 10 and 12 is of a circumferential length such that it will function satisfactorily in the manner hereinafter described, on a variety of sizes of pneumatic tires. I have found such length to be about 44 inches. Variations from this length are contemplated as being within the scope of the invention, however, and such alteration of length will be necessary in the case of some especially large or especially small tires.

Figure 3:
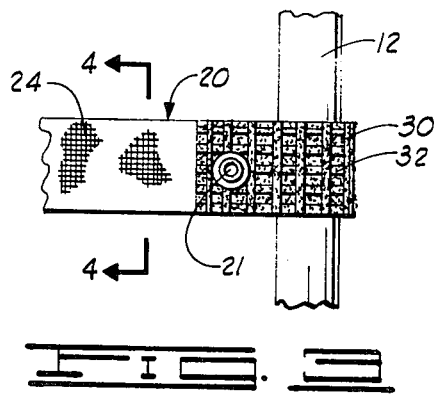
FIG. 3 is an enlarged detail view illustrating the end portion of one of the cross straps and one of the annular tubular elements, both shown in elevation.

Extending transversely between the side wall tubular elements 10 and 12, and spaced from each other therealong are a plurality of transverse traction straps 20. Each of the transverse traction straps 20 is an elongated rectangular element which is constructed of a material specially suited to provide traction as the pneumatic tire upon which the antiskid device is mounted rolls over a very slick surface, such as an icy or snowy roadway. As shown in FIGS. 1 and 3, each of the traction straps 20 is looped or turned back at its opposite ends to provide an encircling bight through which are extended the side wall tubular elements 10 and 12. The construction of the traction straps 20 is such that when the turned over end portions are secured by rivets 21 or sewn to intermediate portions of the strap to form engaging loops, the respective tubular element 10 or 12 is tightly frictionally engaged, and the frictional grip of the traction strap is such that the straps do not slide or become displaced in an axial direction along the tubular element once the device is installed on the tire 13. In some embodiments of the invention, however, it may be desirable to bond the end portions of the traction straps 20 to the tubular elements 10 and 12 with a suitable adhesive.

Figure 4:
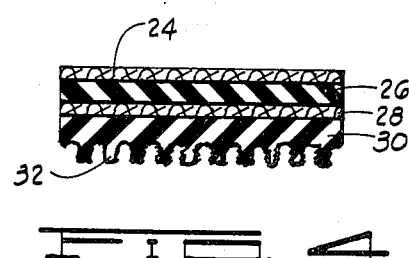
FIG. 4 is a sectional view taken along line 4—4 of FIG. 3.
Figure 4A:
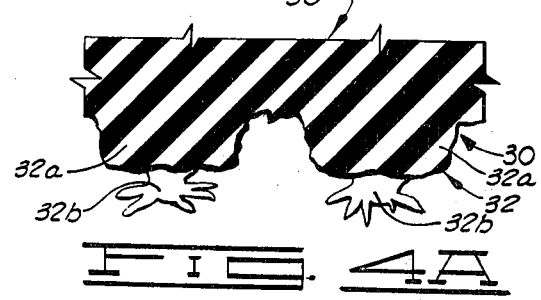
FIG. 4A is an enlarged detail sectional view showing a portion of one of the traction straps used in the antiskid device of the invention.

Each of the traction straps 20 is constructed in the manner best illustrated in FIGS. 1, 3 and 4. Each traction strap 20 is a two-ply laminated nylon webbing rubber element. Thus, at the side of each of the traction straps 20 which is to be adjacent the tread of the tire, a woven, corrugated nylon primary substrate 24 is provided, and is strongly bonded to an adjacent layer of natural rubber 26. The layer of rubber is in turn bonded to a secondary corrugated woven nylon web 28. The nylon web 28 is bonded at its other side to a rubber traction layer or body 30 which is a mixture of natural rubber and asbestos fibers which are molded integrally to form a body having a very high coefficient of friction. A plurality of nubs 32 project outwardly from the asbestosized rubber base 30 and provide elements affording excellent traction with surfaces of very low coefficient of friction, such as ice and packed snow. Each of the nubs 32 has a general appearance of the type shown in FIG. 4A and includes a relatively broad base 32a having a frizzed neck 32b projecting outwardly therefrom.

The asbestos content of the asbestosized rubber helps to prevent melting or thermal breakdown of the rubber as the antiskid device of the invention is used on pneumatic tires rotating at high speeds. This construction also is of great utility in extending the effective service life of the antiskid device where it is utilized after the ice and snow has melted, and the antiskid device is still in place on the tire as the automobile is driven on dry pavement, gravel or the like.

In practice, I have found that the utilization of ten equally spaced traction straps 20, each joined at its opposite ends to the side wall tubular members 10 and 12, is a very effective arrangement for most passenger vehicle tire sizes. The number of the traction straps 20 can be varied, however, and it may be desirable to use more of the traction straps on especially icy roads.

One of the important features of the present invention is the ease with which the antiskid device of the invention can be mounted on a fully inflated pneumatic tire. In the installation of the antiskid device, one of the side wall tubular members 10 or 12 is initially gripped at two points spaced therealong and the intermediate portion between these gripping points is then extended over the upper side of the tire so that the tubular member bears against the inner side wall of the tire (the side of the tire opposite that on which the person mounting the antiskid device is located). The second of the side wall tubular elements 10 or 12 is then extended along a portion of the outer side wall of the tire. After this has been accomplished, the automobile may be moved forward slightly until the straps 20 which extend between the portions of the tubular elements 10 and 12 which have been positioned in the manner described is at the bottom side of the tire, and the tire rests upon these particular straps. At this time, the remainder of the inside tubular element is pushed over the section of the tire adjacent the top until the entire inner tubular element has been positioned over the tire and adjacent the inwardly facing side wall thereof. At this time, the second of the two tubular elements is pulled back over the tire and released so that it contracts to position itself adjacent the outer side wall of the tire and in contact therewith.

Figure 2:
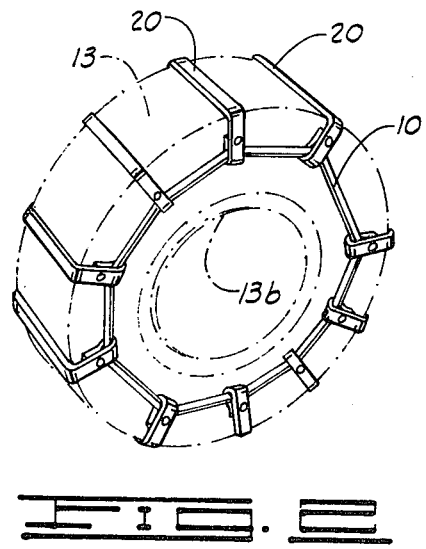
FIG. 2 is a perspective view illustrating the antiskid device mounted on a pneumatic tire with the pneumatic tire and the rim on which it is carried shown in dashed lines.

The antiskid device need not be positioned precisely symmetrically upon the pneumatic tire at the time it is mounted. That is, the spacing between the traction straps 20 need not be exactly uniform, and the polygonal configuration assumed by each of the tubular elements 10 and 12 need not be polygonally regular as shown in the case of the tubular element 10 in FIG. 2. The reason for this is that after the antiskid device has been rotated with the pneumatic tire upon which it is mounted over approximately 1 mile of travel at speeds in excess of about 10 miles per hour, it will adjust itself to the regular and symmetrical configuration illustrated in FIG. 2.

I have determined that the construction of the traction straps affords an extremely durable and long-wearing antiskid device, and that these traction straps are extremely effective in affording excellent traction on icy surfaces. Also, the antiskid device of the invention causes essentially no wear to the pneumatic tire upon which it is mounted. Since the device can be easily and quickly mounted, it is not required to jack up the tire to place it in position, or to fumble with snaps or couplings, as is the case with many types of chains now used on pneumatic tires during icy weather conditions.

Although I have described a preferred embodiment of the invention in referring to the drawings submitted with this application, it will be understood that such references are by way of example only, and that various changes and modifications may be made in the illustrated and described structure without departure from the basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. An antiskid device for pneumatic tires comprising:
    a pair of opposed, spaced, annular sidewall elastomeric tubular elements;
    a plurality of spaced transverse traction straps extending between and connected to each of said tubular elements, each of said traction straps comprising:
    a woven nylon primary substrate at one side of the strap;
    a woven nylon secondary layer spaced from said substrate;
    a layer of rubber between, and bonded to, said nylon substrate and said nylon second layer; and
    a body of rubber bonded to said nylon second layer on the side thereof opposite said layer of rubber, and including a plurality of nubs of rubber projecting therefrom, each of said nubs including a base having a frizzed neck projecting outwardly therefrom, said traction strap construction being such that when said primary substrate engages the face of a tire upon which the device is mounted, said body of rubber faces outwardly in a ground engaging position and is tensioned through its extension through a greater distance than said primary substrate.

2. An antiskid device as defined in claim 1 wherein each of said tubular elements is natural rubber and has an inside diameter from about ¼ inch to about ½ inch, and a wall thickness of from about ⅛ inch to about 3/16 inch.

3. An antiskid device as defined in claim 1 wherein each of said traction straps is turned back upon itself at each of its opposite ends to form a loop encircling and frictionally engaging one of said tubular elements, and said device further includes means securing each of the turned back strap ends to an intermediate portion of the respective strap.

4. An antiskid device as defined in claim 1 wherein said body of rubber, including said nubs, is asbestosized rubber having asbestos fibers imbedded therein.

5. An antiskid device as defined in claim 2 wherein each of said tubular elements is natural latex rubber and has an inside diameter of ¼ inch and a wall thickness of 3/16 inch.

6. An antiskid device as defined in claim 1 wherein each of said tubular elements is natural latex rubber, and has an inside diameter of ¼ inch and a wall thickness of 3/16 inch.

7. An antiskid device as defined in claim 6 wherein said body of rubber, including said nubs, is asbestosized rubber having asbestos fibers imbedded therein.

8. An antiskid device as defined in claim 7 wherein each of said traction straps is turned back upon itself at each of its opposite ends to form a loop encircling and frictionally engaging one of said tubular elements, and said device further includes means securing each of the turned back strap ends to an intermediate portion of the respective strap.

* * * * *